June 18, 1946.  T. R. SCOTT ET AL  2,402,451
JOINT AND TERMINATIONS FOR ELECTRIC POWER CABLES
Filed Nov. 18, 1942
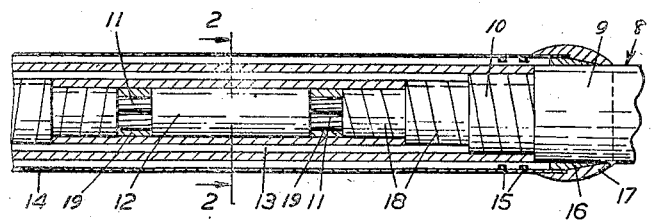
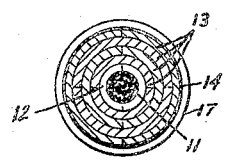 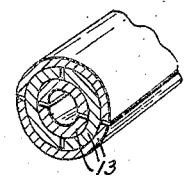 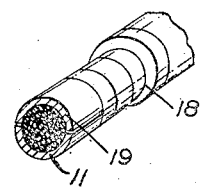
INVENTORS
Thomas R. Scott
Edwin C. Lee
BY
D. G. Angus
ATTORNEY Patented June 18, 1946

2,402,451

UNITED STATES PATENT OFFICE 2,402,451

JOINT AND TERMINATION FOR ELECTRIC POWER CABLES

Thomas Robertson Scott and Edwin Charles Lee, London W. C. 2, England, assignors to International Standard Electric Corporation, New York, N. Y.

Application November 18, 1942, Serial No. 465,956 In Great Britain December 5, 1941

11 Claims. (Cl. 174—84)

This invention relates to the manufacture of joints for high-tension electric cables.

Objects of the invention are to provide a process of manufacturing such joints which is adapted for use in the field; to reduce the time involved in making a joint, especially in comparison with the known hand-lapping processes; and to provide a better and more uniform quality in the finished joints.

The present invention makes use of preformed insulating elements such as longitudinally-split telescoped paper tubes bonded by thermoplastic material. Such tubes can be made from styrenated paper by a hot rolling process; but in order to allow for the additional pressing operation the tubes would be rolled under comparatively light pressure. It is preferable to include excess polystyrene between layers of paper, and this may be achieved by coating one or both surfaces of the paper with a polystyrene lacquer. This excess polystyrene will then flow during the subsequent pressing operation, and serves to fill any gaps existing in the built-up tubes.

This additional layer of polystyrene may be plasticised to promote flow. The choice of material is not limited to polystyrene compounds, but may include any thermoplastic material which can be spread on to the paper, or interleaved with the paper during the hot rolling process. In the case of rubber or rubber mixes, a vulcanising agent may be added so as to vulcanise the rubber during the final pressing operation. The invention is applicable to joints in which the insulation is stripped from end portions of the conductors either throughout the entire thickness of the insulation or in successive steps; and a cylindrical metal ferrule is clamped over the abutting ends of the stripped conductors, the ends of the ferrule being normally spaced from the adjoining ends of the insulation. The joint ferrule would preferably be parallel and either the same diameter as the insulation core, or if the core were stepped, the same diameter as the first step. The space between the ferrule and the end of the insulation could be filled with a split filler of styrenated paper, to form a parallel surface on which the first split tube would fit. Additional tubes would then be added until the required diameter was obtained, the joints being staggered.

Other objects will appear from the following description of an illustrative embodiment of the invention taken together with the attached drawing wherein:

Fig. 1 is a longitudinal center section through a portion of a joint embodying the invention;

Fig. 2 is a transverse section on the line 2—2 of Fig. 1;

Fig. 3 is a perspective end view of a superposed series of telescoped paper tubes with their ends in section, showing the arrangement of the longitudinal joints; and Fig. 4 is a perspective view of an end of one cable with the insulation stripped back in steps and the split paper filler in place, the conductor being shown in section.

In Figs. 1–4 of the drawing, which illustrates a joint including end portions of two single conductor cables 8 each including a metal sheath 9 and thick multiple layer insulation 10 surrounding a conductor 11, the conductors 11 are joined in the usual manner by the ferrule 12, and the whole is encased in the styrenated tubes 13 and the outer brass or copper tube 14, rubber rings 15 being fitted in grooves in the periphery of the outermost styrenated tube 13. At the end of the outer tube 14 is a split lead bush 16 and a sweated joint 17. The layers of insulation 10 are cut away radially at staggered points, providing stepped lapping, as indicated at 18 and a small split bush between the ferrule 12 and the end of the cutaway core as shown at 19.

As an alternative, the split bush 19 may be replaced by a simple moulding of styrene compound around the ferrule. A slight gap would be allowed between the halves of each cylinder, as shown in Fig. 3 and after assembly the mould is applied, heated, and tightened up. Any flash is removed and pressing repeated.

The cylinders would be made from hot rolled styrenated paper with possibly an additional pressing process. A standard range of diameters would cover all joints and lengths would be cut to suit any particular joint. The insulation where stepped would be cut to fit the length of cylinder. Provided that the correct gap is allowed it should be possible to avoid distortion of the cylinders and the core.

Sleeves for single core joints may be arranged in several ways: for example a lead sleeve may be swaged down onto the built up core and dressed over the ends onto the cable, to which it is wiped. Another method would be a close fitting copper sleeve applied over lacquer. The outer bushing could be provided with several grooves to take rubber rings 15, following usual practice, the screening tape being applied over the rings onto which the sleeve would be rolled. Alternatively the copper sleeve may be a loose fit and the space filled by extrusion.

A shot moulding process might be suitable for the pressing process in place of a mould.

While we have described above the principles of our invention in connection with one specific form, it is to be clearly understood that the description is made only by way of example and not as a limitation on the scope of our invention as set forth in the objects and the accompanying claims.

What is claimed is:

1. A process of making butt joints between ends of electric cables having central conductors covered with thick insulation which comprises shaping each of the cable ends to be joined to provide a projecting core section of insulation enclosing the conductor and terminating in a radial shoulder, joining the conductor ends with the core sections in alignment, placing around the core sections a preformed cylinder of insulating material extending between said shoulders and in axial alignment therewith and fastening said cable ends and cylinder in place, said cylinder being supported by a surface formed by placing around the conductor ends a ferrule spaced from said shoulders and inserting plastic material into the gaps between the ferrule and the shoulders of the cable insulation and molding said material by applying heat and pressure.

2. A process of making butt joints between ends of electric cables having central conductors covered with thick insulation which comprises shaping each of the cable ends to be joined to provide a projecting core section of insulation enclosing the conductor and terminating in a radial shoulder, joining the conductor ends with the core sections in alignment, placing around the core sections a preformed cylinder of insulating material extending between said shoulders and in axial alignment therewith and fastening said cable ends and cylinder in place, said cylinder including at least a portion containing thermoplastic material, and forming said material after its insertion by applying heat and pressure.

3. A process of making butt joints between ends of electric cables having central conductors covered with thick insulation which comprises shaping each of the cable ends to be joined to provide a projecting core section of insulation enclosing the conductor and terminating in a radial shoulder, joining the conductor ends with the core sections in alignment, placing around the core sections a preformed cylinder of insulating material extending between said shoulders and in axial alignment therewith and fastening said cable ends and cylinder in place, said cylinder including a plurality of mating half cylinders containing thermoplastic material, placing said cylinders on the conductors with their longitudinal edges spaced and pressing the cylinders into position in the presence of plasticising heat.

4. A process of making butt joints between ends of electric cables having central conductors covered with thick insulation which comprises shaping each of the cable ends to be joined to provide a projecting core section of insulation enclosing the conductor and terminating in a radial shoulder, joining the conductor ends with the core sections in alignment, placing around the core sections a preformed cylinder of insulating material extending between said shoulders and in axial alignment therewith and fastening said cable ends and cylinder in place, said cylinder being formed at least in part from paper carrying an excess of thermoplastic material, and applying the cylinders with heat and pressure, said excess material flowing into adjacent voids to form a solid cylinder.

5. A process for making butt joints between the ends of electric cables having central conductors covered with thick insulation, which comprises shaping the cable ends with the conductor projecting from core sections, applying a ferrule around a butt joint between the conductors, the ferrule being spaced at its end from the core sections, filling the gap between the ends of the core sections and the ferrule with insulation in the form of split cylinders to provide a surface of substantially uniform diameter with the core sections, applying a preformed cylinder to said surface, and fixing said cylinders in place by the application of heat and pressure.

6. In the method of making a butt joint by the use of nested insulating cylinders between the opposed ends of two cables each having a central conductor surrounded by a relatively thick insulation, the steps of forming the insulation of each cable end downwardly toward the cable end in a series of steps of a depth equal to the thickness of corresponding cylinders, joining the conductor ends, aligning the cables, and applying said series of nested insulating cylinders to the opposed stepped insulation portions, respective cylinders of the series covering the corresponding ends of each stepped insulating portion, whereby the external diameter of each sleeve corresponds to the diameter of the next larger step, said sleeves having a length equal to the distance between opposed steps of the opposed cable ends.

7. A process of making butt joints between the ends of electric cables having central conductors covered with thick insulation, which comprises shaping each of the cable ends to provide a series of stepped projecting core sections of the insulation enclosing the conductor, joining the conductor ends with the core sections in alignment, placing the series of superposed preformed insulating cylinders containing thermoplastic material around the joint ends, each cylinder fitting over a core section of each cable, fixing the cylinders in place by the application of heat and pressure, and fastening the cable ends in place.

8. A process of making butt joints between the ends of electric cables having central conductors covered with thick insulation, which comprises shaping each of the cable ends to provide a series of stepped projecting core sections of the insulation enclosing the conductor, joining the conductor ends with the core sections in alignment, placing a series of superposed insulating cylinders around the joint ends, each cylinder fitting over a core section of each cable, and fixing the cylinders in place by pressing them into engagement with each other and applying heat to form a unitary solid insulating cover for the joined conductors.

9. A process of making butt joints between the ends of electric cables having central conductors covered with thick insulation, which comprises shaping each of the cable ends to provide a series of stepped projecting core sections of the insulation enclosing the conductor, joining the conductor ends with the core sections in alignment, placing a series of superposed mating half cylinders of paper impregnated with a thermoplastic material around the joint ends, the mating half cylinders fitting over a core section of each cable and fixing the mating half cylinders in place by applying heat, and pressure sufficient to bring the mating edges of the cylinders together and to join adjacent cylinder faces to form a unitary insulating cover for the conductor joint.

10. A process of making butt joints between the ends of electric cables having central conductors covered with thick insulation, which comprises shaping each of the cable ends to provide a series of stepped projecting core sections of the insulation enclosing the conductor, joining the conductor ends with the core sections in alignment, placing a series of superposed insulating mating half cylinders around the joint ends, in such a way that the longitudinal ends of each pair of said mating half cylinders are circumferentially offset in two adjacent superposed cylinders, each cylinder fitting over a core section of each cable, fastening said cable ends and cylinders in place, and closing the longitudinal mating edges of each pair of said mating half cylinders by the application of heat and pressure to the outermost cylinder.

11. A butt joint for cables, comprising, in combination, a pair of opposed cable ends, each cable end having a central conductor surrounded by insulation, means interconnecting said conductors, the insulation of each cable end being stepped downwardly in equal number of steps toward the connection between the conductors, and a series of nested insulating cylinders surrounding the joint between the conductors and the opposed stepped insulation portions, respective cylinders of the series covering the corresponding ends of each stepped insulation portion, having a thickness equal to the depth of the steps, and a length equal to the distance between opposed shoulders of corresponding steps.

THOMAS ROBERTSON SCOTT.
EDWIN CHARLES LEE.